United States Patent
Zheng et al.

(10) Patent No.: US 12,443,083 B1
(45) Date of Patent: Oct. 14, 2025

(54) OPTICAL FILM AND PREPARATION METHOD THEREFOR AND APPLICATION THEREOF

(71) Applicant: SHAANXI JINGCAI MINGWEI TECHNOLOGY CO., LTD, Xianyang (CN)

(72) Inventors: Rujing Zheng, Xianyang (CN); Yanquan Chen, Xianyang (CN)

(73) Assignee: SHAANXI JINGCAI MINGWEI TECHNOLOGY CO., LTD, Xianyang (CN)

( * ) Notice: Subject to any disclaimer, the term of this patent is extended or adjusted under 35 U.S.C. 154(b) by 0 days.

(21) Appl. No.: 19/250,043

(22) Filed: Jun. 25, 2025

Related U.S. Application Data

(63) Continuation of application No. PCT/CN2024/070576, filed on Jan. 4, 2024.

(30) Foreign Application Priority Data

Jan. 5, 2023 (CN) .................. 202310014099.X

(51) Int. Cl.
*G02F 1/1333* (2006.01)
*C09K 19/20* (2006.01)
*C09K 19/30* (2006.01)
*C09K 19/58* (2006.01)
*G02B 1/12* (2006.01)
(Continued)

(52) U.S. Cl.
CPC ...... *G02F 1/13718* (2013.01); *C09K 19/2007* (2013.01); *C09K 19/3003* (2013.01); *C09K 19/586* (2013.01); *G02B 1/12* (2013.01); *G02F 1/133603* (2013.01);
(Continued)

(58) Field of Classification Search
CPC ............. G02F 1/1333; G02F 1/133603; G02F 1/13718; G02B 1/12; C09K 19/38; C09K 19/2007; C09K 19/3003; C09K 19/586; C09K 2019/0444; C09K 2019/301; C09K 2019/2078
See application file for complete search history.

(56) References Cited

U.S. PATENT DOCUMENTS 7,875,325 B2 * 1/2011 Oikawa ................ G02B 5/3025
349/193
8,248,558 B2 * 8/2012 Kimura ............. G02F 1/133528
349/96

FOREIGN PATENT DOCUMENTS

CN 101116019 A 1/2008

* cited by examiner

*Primary Examiner* — Geraldina Visconti
(74) *Attorney, Agent, or Firm* — Nitin Kaushik

(57) ABSTRACT

An optical film, a preparation method therefor and an application thereof are provided. The preparation method includes: performing an alignment treatment on a first release film to obtain a carrier film; unrolling the carrier film, and coating a surface of the carrier film with a first liquid crystal mixture to form a brightness enhancement film; coating a surface of the brightness enhancement film with a photosensitive monomer material and photo-crosslinking under linear polarization ultraviolet irradiation to form an alignment layer; coating the alignment layer with a second liquid crystal mixture to form a liquid-crystal phase retardation film; combining a second release film on a side of the liquid-crystal phase retardation film and rolling, peeling off the first release film, applying an OCA onto the brightness enhancement film, and combining a third release film on a side of the OCA facing away from the brightness enhancement film and rolling.

10 Claims, 2 Drawing Sheets

(51) Int. Cl.
*G02F 1/13357* (2006.01)
*G02F 1/137* (2006.01)
(52) U.S. Cl.
CPC ................ *C09K 2019/2078* (2013.01); *C09K 2019/301* (2013.01); *C09K 2219/03* (2013.01)

OPTICAL FILM AND PREPARATION METHOD THEREFOR AND APPLICATION THEREOF

CROSS-REFERENCE TO RELATED APPLICATIONS

This application is a continuation of International Patent Application No. PCT/CN2024/070576, filed on Jan. 4, 2024, which claims the priority of Chinese Patent Application No. 202310014099.X, filed on Jan. 5, 2023, both of which are herein incorporated by reference in their entirety.

TECHNICAL FIELD

The disclosure relates to the technical field of optical films, and more particularly to an optical film and a preparation method therefor and an application thereof.

BACKGROUND

An organic light-emitting diode (OLED) does not require a backlight module, making its structure relatively much simpler, so that an OLED display has always been considered as a perfect display. However, due to its short service life, high maintenance cost, and susceptibility to ambient light, light-reflections would occur in indoor or outdoor strong lighting. A reflected light from a metal electrode will cause significant imaging interference, reduce display contrast, and create reading disturbances, resulting in poor dark-state performance (i.e., "dark not being dark"). Generally, a circular polarizer that can resist ambient light reflection is added to effectively counteract the ambient light and reduce display interference. In related art, the circular polarizer is composed of a linear polarizer combined with a retardation film. However, light emitted by an organic layer of OLED will be absorbed by 50% when passing through the circular polarizer, resulting in low light transmittance and poor light utilization rate.

A liquid crystal display (LCD), due to its advantages such as low cost, wide viewing angle, fast response speed and broad operating temperature range, has been widely applied in display fields like mobile phones, computers, and televisions. However, due to a structural limitation of the LCD, a theoretical maximum utilization rate of light emitted by a backlight source is only 16.67%, and an actual light utilization rate of the light emitted by the backlight source is less than 10%. Therefore, there is an urgent need for an optical film to improve the light utilization rate in the displays and enhance screen brightness and contrast.

To solve the problem of low light utilization rate in the displays, a brightness enhancement film can be added to improve the light utilization rate. A main method in related art for adding the brightness enhancement film involves adhesion using an optically clear adhesive (OCA), which introduces challenges such as increased screen thickness to hinder fabrication of flexible displays, and more complex manufacturing process to raise cost.

SUMMARY

An objective of the disclosure is to obtain an ultra-thin, stable optical film capable of improving a light utilization rate.

Based on aforementioned objective, the disclosure provides an optical film and a preparation method and an application thereof to meet needs in this field.

In one aspect, a preparation method of an optical film provided by an embodiment of the disclosure includes: performing an alignment treatment on a first release film to obtain a carrier film; unrolling the carrier film, coating a surface of the carrier film with a first liquid crystal mixture used for preparing a brightness enhancement film, then drying and ultraviolet irradiation curing the first liquid crystal mixture to form the brightness enhancement film; coating photosensitive monomers on a surface of the brightness enhancement film, and photo-crosslinking the photosensitive monomer material under linear polarization ultraviolet irradiation to form a cross-linked thin polymer film as an alignment layer; coating the alignment layer with a second liquid crystal mixture used for preparing a phase retardation film, and then drying and ultraviolet irradiation curing the second liquid crystal mixture to form a liquid-crystal phase retardation film; combining a second release film on a side of the liquid-crystal phase retardation film and rolling, peeling off the first release film, applying an OCA onto the brightness enhancement film, and combining a third release film on a side of the OCA facing away from the brightness enhancement film and rolling.

In an exemplary embodiment, the photosensitive monomer material includes hexafluorobisphenol A diallyl ether (6F-BADE), octafluorohexanediol diallyl ether (8F-HDE) and photosensitive polyarylene ether (PSPAE); and a chemical structure of the photosensitive polyarylene ether (PSPAE) is as follows:

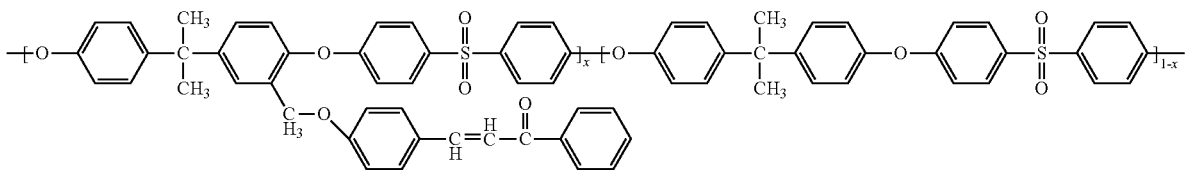

where, a range of x is 0.8.

In an exemplary embodiment, an alignment method can be physical alignment treatment or chemical alignment treatment. The physical alignment treatment may be magnetic field alignment treatment or electric field alignment treatment. The chemical alignment treatment may be an oblique evaporation method or photoalignment treatment.

In an exemplary embodiment, the photosensitive monomer material is coated on the surface of the brightness enhancement film to undergo photo-crosslinking reaction under linear polarization ultraviolet irradiation, to thereby form the cross-linked polymer film. The cross-linked polymer film can induce liquid crystal molecules to arrange uniformly, and thereby form the alignment layer for alignment.

In an exemplary embodiment, a coatable OCA is coated on a side of the brightness enhancement film facing away from the liquid-crystal phase retardation film. After the OCA is dried by heating and cured by ultraviolet light irradiation, the third release film is combined on the side of the OCA facing away from the brightness enhancement film and rolled to thereby obtain an optical film finished product. In an alternative embodiment, an OCA finished product is employed, and the OCA finished product is directly pasted onto the side of the brightness enhancement film facing away from the liquid-crystal phase retardation film to thereby obtain the optical film finished product. When in use, the third release film on a side of the OCA can be peeled off, so that the brightness enhancement film and the liquid-crystal phase retardation film can be pasted onto a suitable position for use.

In an exemplary embodiment, the OCA is ultraviolet curable acrylic optical adhesive, and after ultraviolet curing, the OCA has a haze less than 3% at 85 Celsius Degrees (° C.) for 480 hours, a light transmittance greater than 97%, a refractive index in a range of 1.5 to 1.7, a shrinkage rate in a range of 0% to 2.5%, and a thickness in a range of 10 micrometers (m) to 100 m. In a preferred embodiment, the refractive index of the OCA is close to that of the brightness enhancement film.

In an embodiment, in the preparation method for the optical film provided by the disclosure, the first release film, the second release film, or the third release film is a high-temperature resistant release film. The high-temperature resistant release film has no precipitation at a temperature in a range of 150° C. to 200° C. for 30 minutes, and has a release force in a range of 1 gram (g) to 110 g, a thickness in a range of 15 μm to 85 μm, a thermal shrinkage rate in a range of −1.5% to +1.5%, a light transmittance greater than 85%, a wetting tension in a range of 52 millinewtons per meter (mN/m) to 60 mN/m, and a haze less than 5%.

In an exemplary embodiment, a material of each the release film is one of polyethylene (PE), polypropylene (PP), polyethylene terephthalate (PET), polyether sulfone (PES), polystyrene (PS), polycarbonate (PC), and polymethyl methacrylate (PMMA).

In an embodiment, in the preparation method for the optical film provided by the disclosure, a surface of the first release film used for coating the first liquid crystal mixture is performed with single-side corona treatment.

In an exemplary embodiment, the first release film, the second release film, and the third release film all are release films after single-side corona treatment. Surface roughness of the release film is increased after the single-side corona treatment. After physical and chemical modification, wettability and adhesion of plastic surface can be significantly improved to enhance adhesion between materials, thereby better protecting the material and preventing generation of defects such as dust and bubbles.

In an embodiment, in the preparation method for the optical film provided by the disclosure, the first liquid crystal mixture or the second liquid crystal mixture includes a polymerizable liquid crystal monomer, a photoinitiator, an additive, a chiral dopant, and a solvent. The brightness enhancement film is a chiral nematic or cholesteric polymer liquid crystal film, with a reflection wavelength in a range of 380 nanometers (nm) to 2000 nm and a refractive index of in a range of 1.5 to 1.7. The liquid-crystal phase retardation film is a polymer liquid crystal film, with a phase retardation value of $$\pm (2k+1)\frac{\pi}{2}$$

within a visible light wavelength range, where k is an integer. A temperature at which the first liquid crystal mixture or the second liquid crystal mixture exhibits a liquid crystal phase is in a range of 20° C. to 80° C.

In an embodiment, in the preparation method for the optical film provided by the disclosure, the polymerizable liquid crystal monomer is one or more of compounds represented by the following formulas I through VII:

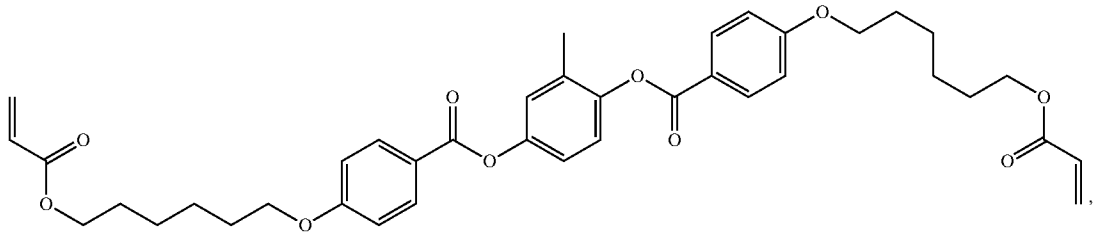

I

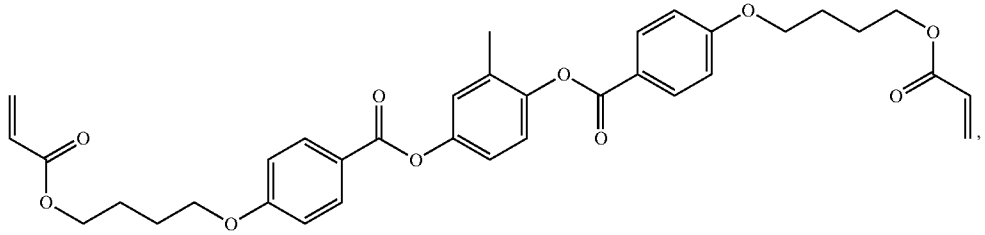

II

-continued

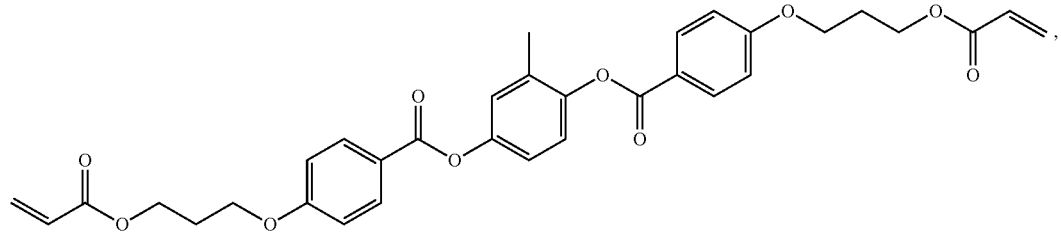

III

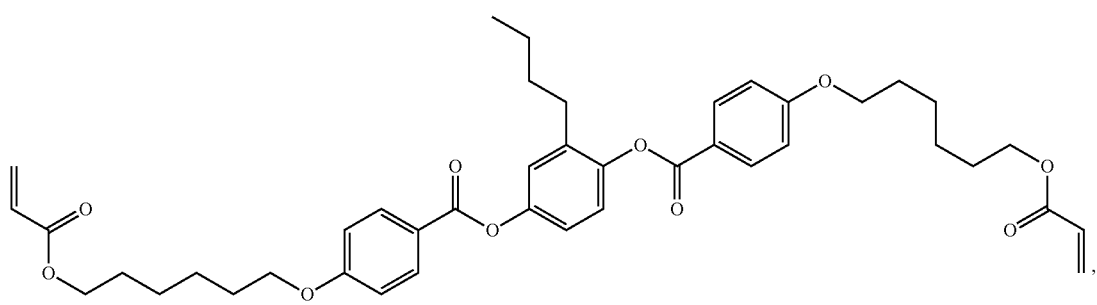

IV

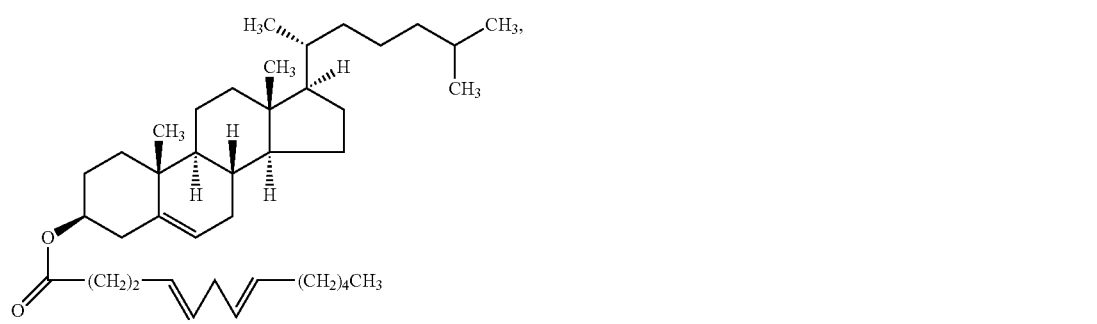

V

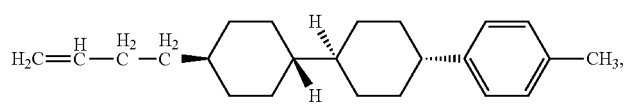

VI

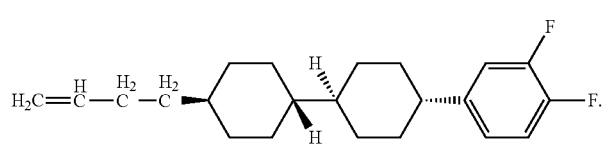

VII

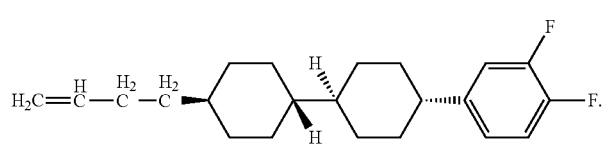

In an embodiment, in the preparation method for the optical film provided by the disclosure, the photoinitiator is one of 2-hydroxy-2-methylpropiophenone, diphenyl-(2,4,6-trimethylbenzoyl) phosphine oxide, 1-hydroxycyclohexyl phenyl ketone, 2-methyl-1-(4-methylthiophenyl)-2-morpholinyl-1-propanone, and 2,2-dimethoxy-2-phenylacetophenone (BDK). The additive includes an antioxidant and/or a light stabilizer, the antioxidant is a hindered phenolic antioxidant, and the light stabilizer is a hindered amine light stabilizer. The chiral dopant preferably is a polymerizable chiral compound. The solvent is one of toluene, ethyl acetate, ethanol, butyl acetate, and xylene. In an preferred embodiment, the chiral dopant is a polymerizable chiral dopant with a high helical twisting power (HTP) value, and is one of compounds represented by the following formulas VIII through XII.

IX

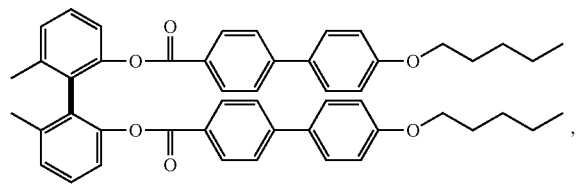

VIII

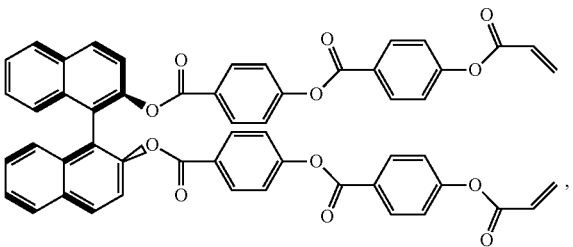

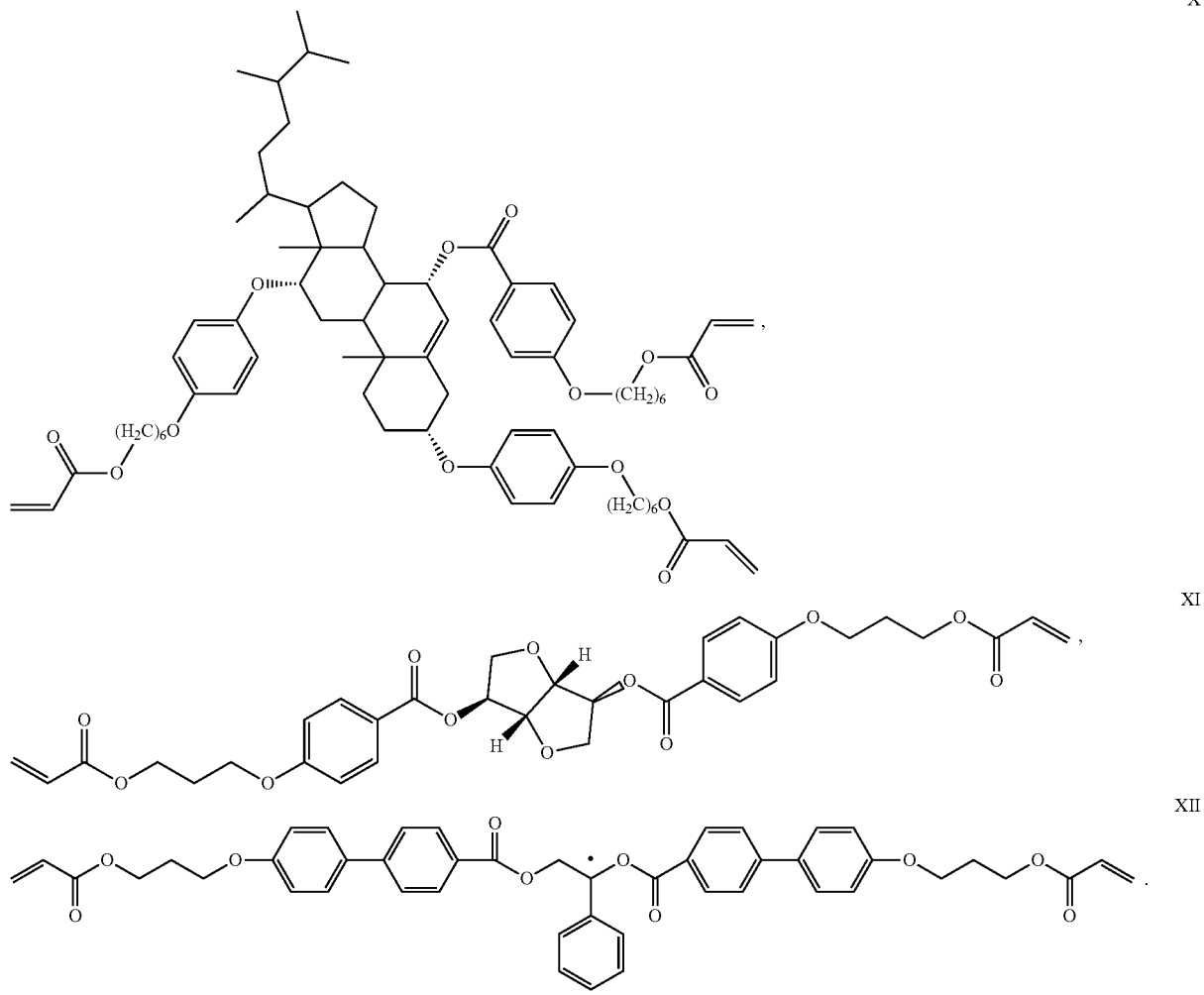

In another aspect, an optical film provided by an embodiment of the disclosure is prepared by using the preparation method for the optical film provided by the disclosure.

In still another aspect, an application/use of the optical film in fabricating/manufacturing an optical display is provided by an embodiment of the disclosure.

In even still another aspect, an OLED display provided by an embodiment of the disclosure includes a linear polarizer, an optical film, and a light-emitting device; and the optical film is the optical film provided by the disclosure.

In further still another aspect, an LCD display provided by an embodiment of the disclosure includes a linear polarizer, an optical film, and a backlight source; and the optical film is the optical film provided by the disclosure.

Compared with the related art, the disclosure may have the following beneficial effects or advantages.

(1) The disclosure provides the preparation method for an optical film, and an ultra-thin, stable optical film capable of improving the light utilization rate can be obtained by using the preparation method.

(2) The disclosure uses the solvent with a suitable/appropriate boiling point to control viscosity and thickness of the liquid crystal mixture, thereby preventing the solvent from being difficult to volatilize due to too high boiling point and avoiding difficulty in controlling the viscosity and thickness of the liquid crystal mixture due to too low boiling point. The (first) release film is performed with single-side corona treatment, which can improve adhesion of the liquid crystal mixture on a substrate, thereby making it easier to coat the liquid crystal mixture evenly and the thickness of the liquid crystal mixture more uniform. The disclosure uses the high-temperature resistant release film to prevent precipitates from polluting the optical film. The release film with low haze and high transparency can achieve high light transmittance, thereby facilitating ultraviolet irradiation to cure the liquid crystal mixture completely and making performance of the brightness enhancement film stable.

(3) The release films used by the disclosure are peelable, helping to reduce a thickness of the optical film without affecting performance of the optical film and the display, and helping the display to be developed in a lighter and thinner direction. By adding the optical film, a brightness is improved, a light utilization rate of a light-emitting layer is improved, the light transmittance is improved, a driving current is reduced, and power consumption of a screen is reduced. The disclosure not only has social significance of energy saving and environmental protection, but also can prolong runtimes of portable devices, reduce a usage degree of a battery, and achieve a purpose of energy saving and prolonging a service life of the battery.

DESCRIPTION OF REFERENCE NUMERALS

1: linear polarizer; 2: optical film; 3: light-emitting device; 4: backlight source; 5: second release film; 6: liquid-crystal phase retardation film; 7: alignment layer; 8: brightness enhancement film; 9: OCA; 10: third release film.

DETAILED DESCRIPTION OF EMBODIMENTS

The following experimental methods and detection/measurement methods in the described embodiments of the disclosure, unless otherwise indicated, are conventional methods in the art. Agents and materials, unless otherwise indicated, can be purchased on markets. Index data, unless otherwise indicated, are conventional measurement methods in the art.

Embodiment 1

Figure 1:
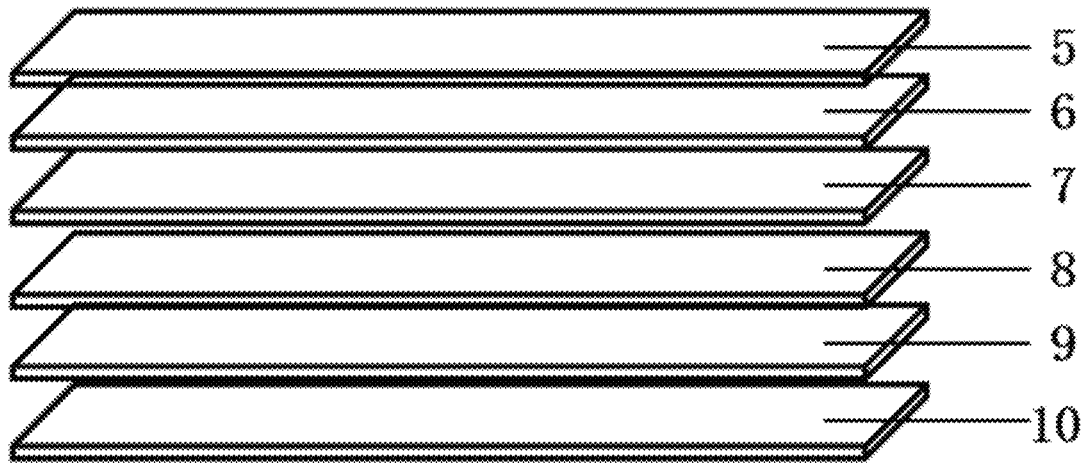
FIG. 1 illustrates a schematic structural exploded view of an optical film according to an embodiment of the disclosure.
Figure 2:
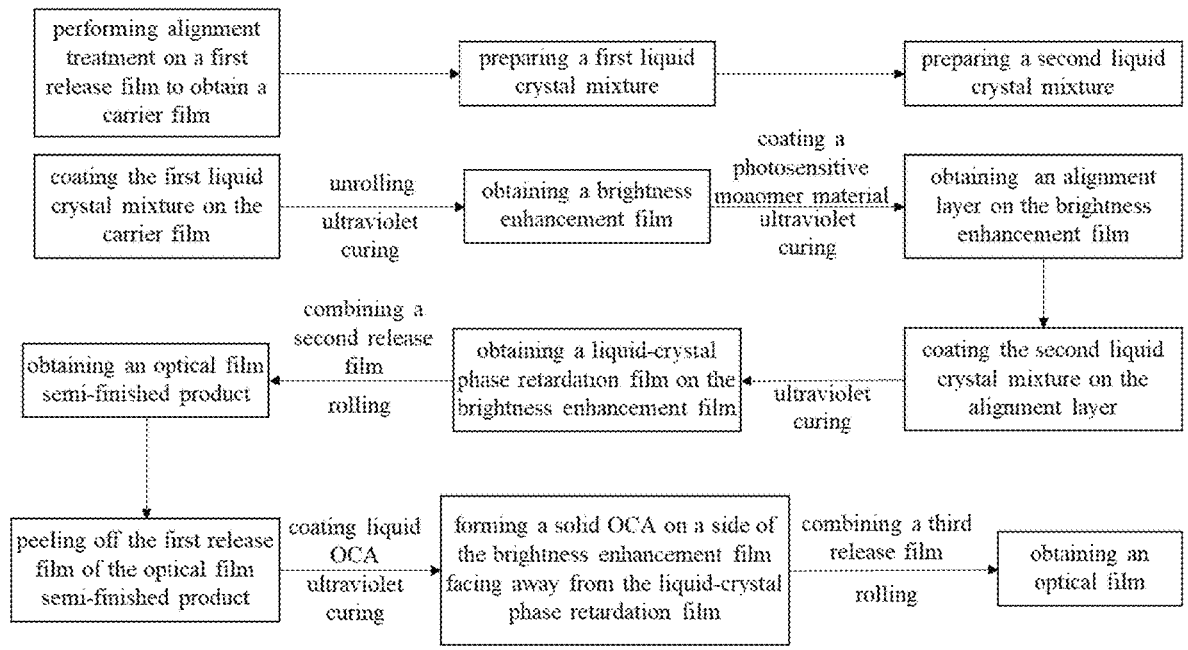
FIG. 2 illustrates a schematic flowchart of a preparation method for an optical film according to an embodiment of the disclosure.

This embodiment provides a preparation process of an optical film. A structure of the optical film as prepared is illustrated in FIG. 1. The preparation process of the optical film is illustrated in FIG. 2.

A first release film, a second release film, and a third release film used in the embodiment are all FG61S polyester films manufactured by Hefei LUCKY Science & Technology Industry Co., Ltd.

S1: alignment treatment of the first release film.

The first release film is performed with alignment treatment such as rubbing alignment treatment or photo alignment treatment, and then the first release film is used as a carrier film.

S2: preparation of liquid crystal mixtures.

Preparation of a first liquid crystal mixture: dissolving a photoinitiator in a part of a solvent to obtain a component A, dissolving an additive in another part of the solvent to obtain a component B, dissolving a polymerizable liquid crystal monomer and a chiral dopant in remaining solvent to obtain a component C, mixing the component A, the component B, the component C uniformly in a liquid tank to form a uniform liquid crystal mixture and controlling a viscosity of the liquid crystal mixture in a range of 5 centipoises (cps) to 50 cps, then heating the liquid crystal mixture at 50° C. to 60° C. for static degassing to thereby obtain a liquid crystal mixture for later use. Multiple types of liquid crystal mixtures can be prepared for later use and used for preparing brightness enhancement films.

Preparation of a second liquid crystal mixture: dissolving a photoinitiator in a part of a solvent to obtain a component A', dissolving an additive in another part of the solvent to obtain a component B', dissolving a polymerizable liquid crystal monomer and a chiral dopant in remaining solvent to obtain a component C', mixing the component A', the component B', the component C' uniformly in a liquid tank to form a uniform liquid crystal mixture and controlling its viscosity in a range of 5 cps to 50 cps; and then heating the liquid crystal mixture at 50° C. to 60° C. for static degassing to thereby obtain a liquid crystal mixture for later use, which is used for preparing wide-band phase retardation films.

Each the liquid crystal mixture is made of the following raw materials: 0% to 98.2% of the polymerizable liquid crystal monomer, 0.3% to 5% of the photoinitiator, 0.3% to 98.0% of the chiral dopant, 0.1% to 2% of the additive, and 1% to 85% of the solvent.

S3: Preparation of the optical film.

The alignment treated and single-side corona treated first release film is used as a carrier film of the first liquid crystal mixture prepared in S2, the carrier film is installed on an unrolling part for unrolling, the first liquid crystal mixture prepared in S2 is uniformly coated on the carrier film in a single layer or multiple layers by using a method such as micro-gravure coating and slide coating. The first liquid crystal mixture then is dried at 150° C. to 200° C. to remove the solvent, and is cured by ultraviolet irradiation to form a film as a brightness enhancement film.

Photosensitive monomers are coated on a surface of the brightness enhancement film and undergoes photo-cross-linking reaction under linear polarization ultraviolet irradiation, to thereby form a cross-linked polymer film. The cross-linked polymer film can induce liquid crystal molecules to arrange uniformly and form an alignment layer for alignment. The alignment layer formed on the brightness enhancement film is used for aligning the second liquid crystal mixture.

The second liquid crystal mixture is coated on the alignment layer, dried at 150° C. to 200° C. and cured by ultraviolet irradiation to thereby form a liquid-crystal phase retardation film.

The first release film, the brightness enhancement film, the alignment layer and the liquid-crystal phase retardation film form a stacked structure. A second release film is combined on a side of the stacked structure where the liquid-crystal phase retardation film is located (i.e., generally the side of the liquid-crystal phase retardation film) and rolled to thereby obtain a optical film semi-finished product. The first release film close to the brightness enhancement film in the optical film semi-finished product then is peeled off.

A liquid OCA is coated on a side of the brightness enhancement film facing away from the liquid-crystal phase retardation film, then is dried by heating and cured by ultraviolet irradiation to thereby form a solid OCA.

A third release film is combined on a side of the optical film semi-finished product close to the solid OCA and rolled, to thereby obtain an optical film finished product. A structure of the optical film finished product is illustrated in FIG. 1.

In an exemplary embodiment, various components of the first liquid crystal mixture are as follows.

The polymerizable liquid crystal monomer is compounds represented by the following formulas I, II and IV:

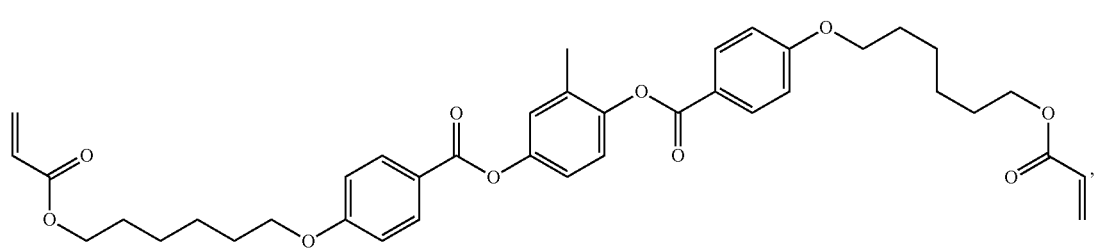

I

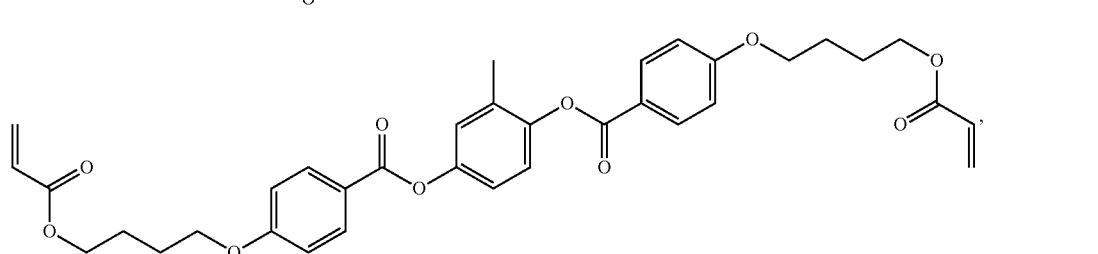

II

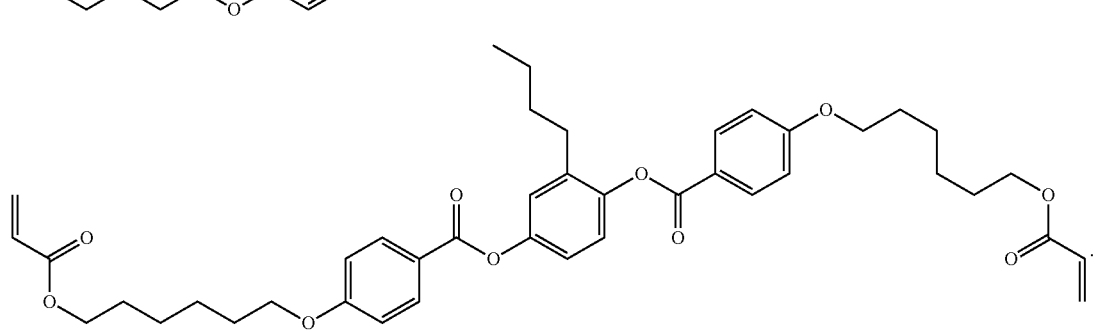

IV

The chiral dopant is a compound represented by the following formula VIII:

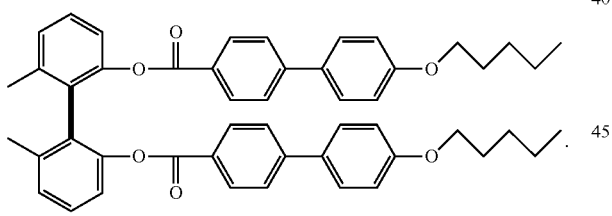

VIII

The photoinitiator is 2,2-dimethoxy-2-phenylacetophenone (BDK).

An antioxidant is β-(3,5-di-tert-butyl-4-hydroxyphenyl) propionic acid octadecyl ester, which has a structural formula as follows:

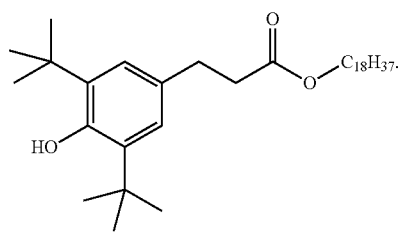

A light stabilizer is poly(4-hydroxy-2,2,6,6-tetramethyl-1-piperidineethanol-alt-1,4-butanedioic acid), which has a structural formula as follows:

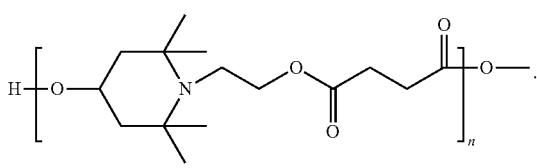

The solvent is ethyl acetate.

In an exemplary embodiment, various components of the second liquid crystal mixture are as follows.

The polymerizable liquid crystal monomer is compounds represented by the following formulas III, IV, VI and VII:

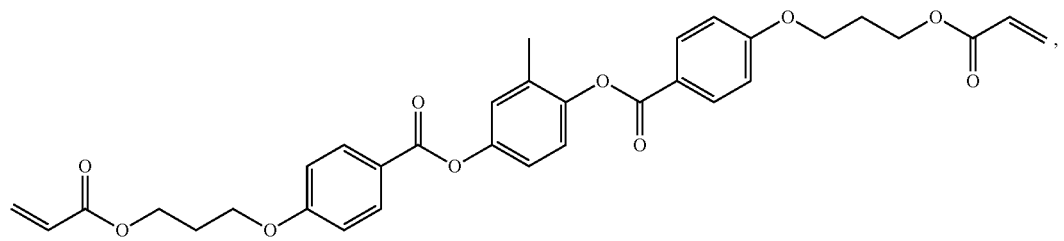
III
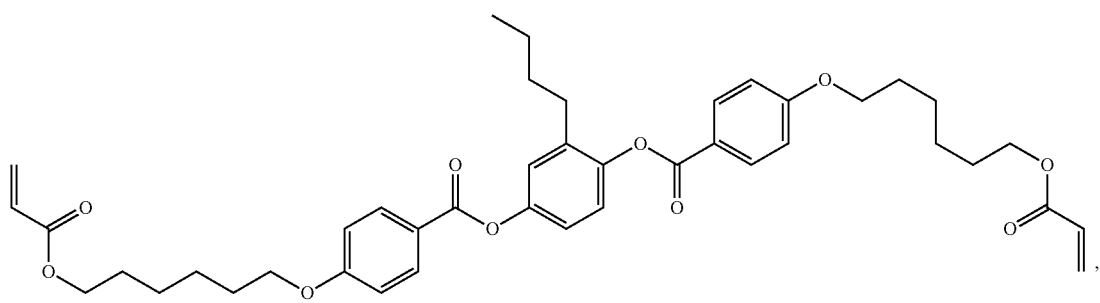
IV
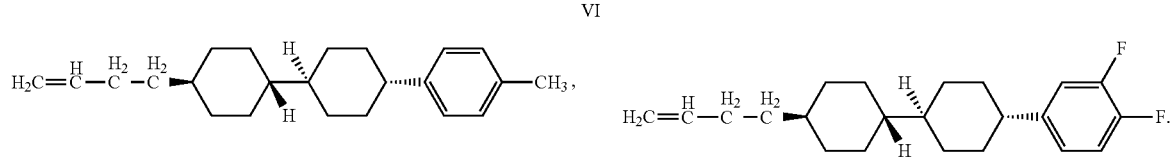
VI                                                                         VII
The chiral dopant is a compound represented by the following formula IX:
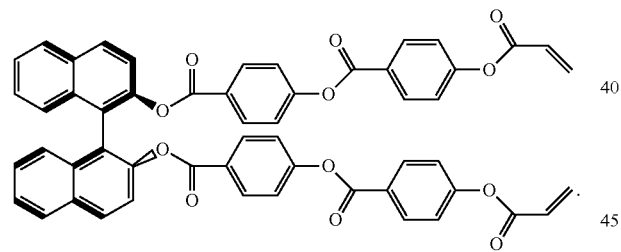
IX
The photoinitiator is 1-hydroxycyclohexyl phenyl ketone.
An antioxidant is 2,2-oxamidobis[ethyl-3-(3,5-di-tert-butyl-4-hydroxyphenyl)propionate], which has a structural formula as follows:
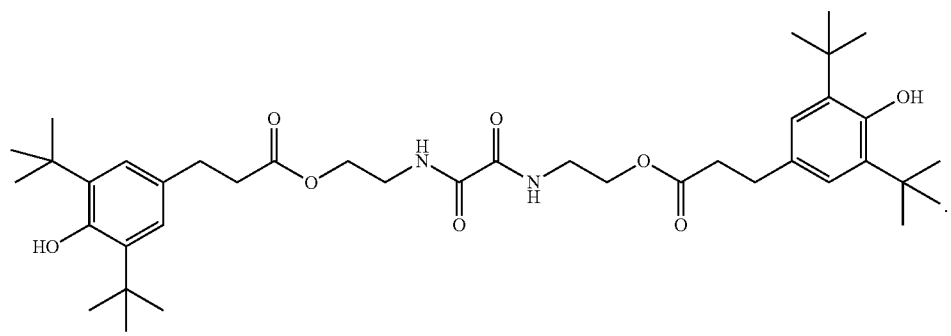 [SMILES: CC(C)(C)c1cc(CCC(=O)OCCNC(=O)C(=O)NCCOC(=O)CCc2cc(C(C)(C)C)c(O)c(C(C)(C)C)c2)cc(C(C)(C)C)c1O]

A light stabilizer is poly{[6-[(1,1,3,3-tetramethylbutyl)amino]]-1,3,5-triazine-2,4-bis[(2,2,6,6,-tetramethyl-piperidinyl)imino]-1,6-hexamethylene[(2,2,6,6-tetramethyl-4-piperidinyl)imino]}, which has a structural formula as follows,

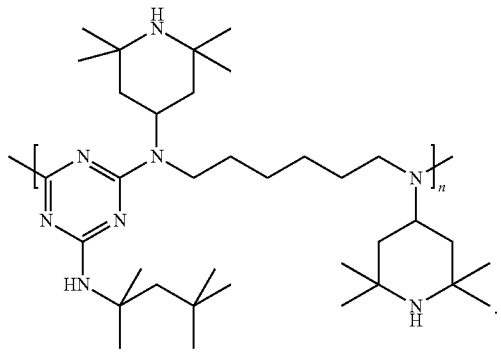

The solvent is toluene.

Embodiment 2

Figure 3:
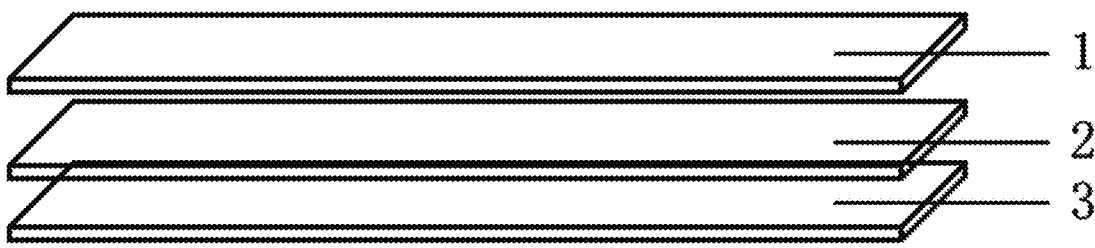
FIG. 3 illustrates a schematic structural exploded view of an OLED display equipped with an optical film according to an embodiment of the disclosure.

This embodiment provides an OLED display, and a structure of the OLED is illustrated in FIG. 3.

In the embodiment, after the third release film of the optical film finished product provided by embodiment 1 is peeled off, a side of the optical film finished product where the OCA is located is pasted with a light-emitting device, and thereby an optical film is located on a side of the OCA facing away from the light-emitting device. After the second release film of the optical film finished product close to the liquid-crystal phase retardation film is peeled off, other optical film can be disposed on the liquid-crystal phase retardation film.

In an optional embodiment, the optical film is disposed between a linear polarizer and the light-emitting device.

In the illustrated embodiment, light emitted by the light-emitting device of the OLED display strikes on the brightness enhancement film, the brightness enhancement film then selectively transmits right-circularly polarized light and reflects left-circularly polarized light, or selectively transmits left-circularly polarized light and reflects right-circularly polarized light. The transmitted circularly polarized light can be completely converted into light perpendicular to an absorption axis of the linear polarizer by the liquid-crystal phase retardation film and emit outwards. The opposite-handed circularly polarized light that does not transmit through the brightness enhancement film is reflected back to a metal electrode by the brightness enhancement film. After being reflected by the metal electrode, its handedness reverses and becomes transmittable through the brightness enhancement film, and then transmits through the liquid-crystal phase retardation film and is similarly converted into light perpendicular to the absorption axis of the linear polarizer and emits outwards.

Embodiment 3

Figure 4:
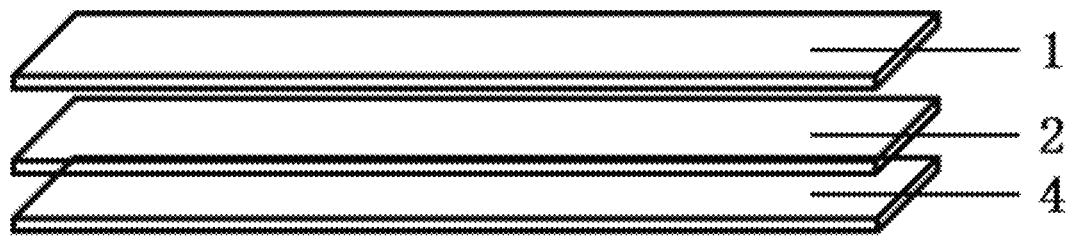
FIG. 4 illustrates a schematic structural exploded view of an LCD display equipped with an optical film according to an embodiment of the disclosure.

This embodiment provides an LCD display, and a structure of the LCD display is illustrated in FIG. 4.

In the embodiment, after the third release film of the optical film finished product provided by embodiment 1 is peeled off, the side of the optical film finished product where the OCA is located is pasted with a backlight source of the LCD display, and thereby an optical film is located on a side of the OCA facing away from the backlight source. After the second release film of the optical film product close to the liquid-crystal phase retardation film is peeled off, other optical film can be disposed on the liquid-crystal phase retardation film.

In an embodiment, the optical film is disposed between a linear polarizer and the backlight source.

In the illustrated embodiment, light emitted by the backlight source strikes on the brightness enhancement film, the brightness enhancement film then selectively transmits right-circularly polarized light and reflects left-circularly polarized light, or selectively transmits left-circularly polarized light and reflects right-circularly polarized light. The transmitted circularly polarized light can be completely converted into light perpendicular to an absorption axis of the linear polarizer by the liquid-crystal phase retardation film and emit outwards. The opposite-handed circularly polarized light that does not transmit through the brightness enhancement film is reflected back to a reflector plate by the brightness enhancement film. After being reflected by the reflector plate, its handedness reverses and becomes transmittable through the brightness enhancement film, and then transmits through the liquid-crystal phase retardation film and is similarly converted into light perpendicular to the absorption axis of the linear polarizer and emits outwards.

Comparative embodiment 1: this comparative embodiment provides an OLED display. In the comparative embodiment, a linear polarizer, the liquid-crystal phase retardation film and the brightness enhancement film are sequentially pasted by the OCA to form an optical film. A side of the optical film 1 close to the brightness enhancement film is pasted onto a light-emitting device by the OCA. The linear polarizer, the liquid-crystal phase retardation film and the brightness enhancement film are the same as those in embodiment 2.

Comparative embodiment 2: this comparative embodiment provides an LCD display. In the comparative embodiment, a linear polarizer, the liquid-crystal phase retardation film and the brightness enhancement film are sequentially pasted by the OCA to form an optical film. A side of the optical film 2 close to the brightness enhancement film is pasted onto a backlight source by the OCA. The linear polarizer, the liquid-crystal phase retardation film and the brightness enhancement film are the same as those in embodiment 3.

Comparative Embodiment 3: this comparative embodiment provides an OLED display. A difference between the comparative embodiment and embodiment 1 is that the OLED display provided by the comparative embodiment has no brightness enhancement film.

Comparative Embodiment 4: this comparative embodiment provides an LCD display. A difference between the comparative embodiment and embodiment 2 is that the LCD display provided by the comparative embodiment has no brightness enhancement film.

Embodiment 4

The embodiment provides performance tests for displays prepared in embodiment 2, embodiment 3 and comparative embodiments 1-4.

Brightness performance of the displays prepared in embodiment 2, embodiment 3 and comparative embodiments 1-4 are tested, and test results are shown in table 1.

Table 1, brightness comparison.

TABLE 1

| | | | sm_0001 | | | |
|---|---|---|---|---|---|---|
| project | embodiment 2 | embodiment 3 | comparative embodiment 1 | comparative embodiment 2 | comparative embodiment 3 | comparative embodiment 4 |
| brightness (candela per square meter (cd/m²)) | 258 | 644 | 252 | 630 | 180 | 450 |

By using the preparation method for the optical film provided by the disclosure, the thickness of the optical film can be reduced by 30 µm to 50 µm due to reduction of a layer of OCA, so that light absorption and light loss in the display can be reduced. At the same time, the optical film uses peelable release films. The peelable release films can serve as protection when the optical film is not in use, and can be peeled off when the optical film is in use, thereby reducing the thickness of the optical film by 15 µm to 85 µm, decreasing interfacial reflection and increasing light gain. When combined with the brightness enhancement film, the light gain can reach as high as 40%. A refractive index of the OCA close to the brightness enhancement film is close to that of the brightness enhancement film, thereby reducing occurrence of defects such as color lines and improving a product yield. By reducing use of a layer of OCA and using the peelable release films, the disclosure reduces the thickness of the optical film without affecting performance of the optical film and the display, thereby helping the display to be developed in a lighter and thinner direction, and further improving a light transmittance and contrast of the display.

What is claimed is:

1. A preparation method for an optical film, comprising:
    performing an alignment treatment on a first release film to obtain a carrier film;
    unrolling the carrier film, coating a surface of the carrier film with a first liquid crystal mixture used for preparing a brightness enhancement film, then drying and ultraviolet irradiation curing to form the brightness enhancement film; and coating a surface of the brightness enhancement film with photosensitive monomers, and photo-crosslinking under linear polarization ultraviolet irradiation to form a cross-linked polymer film as an alignment layer;
    coating the alignment layer with a second liquid crystal mixture used for preparing a phase retardation film, then drying and ultraviolet irradiation curing to form a liquid-crystal phase retardation film; and
    combining a second release film on a side of the liquid-crystal phase retardation film and rolling, peeling off the first release film, applying an optically clear adhesive (OCA) onto the brightness enhancement film, and combining a third release film on a side of the OCA facing away from the brightness enhancement film and rolling.

2. The preparation method for the optical film as claimed in claim 1, wherein the first release film, the second release film, or the third release film is a high-temperature resistant release film; and
    wherein the high-temperature resistant release film has no precipitation at a temperature in a range of 150 Celsius Degrees (° C.) to 200° C. for 30 minutes, and has a release force in a range of 1 gram (g) to 110 g, a thickness in a range of 15 micrometers (m) to 85 µm, a thermal shrinkage rate in a range of −1.5% to +1.5%, a light transmittance greater than 85%, a wetting tension in a range of 52 millinewtons per meter (mN/m) to 60 mN/m, and a haze less than 5%.

3. The preparation method for the optical film as claimed in claim 1, wherein a surface of the first release film used for coating the first liquid crystal mixture is performed with single-side corona treatment.

4. The preparation method for the optical film as claimed in claim 1, wherein the first liquid crystal mixture or the second liquid crystal mixture comprises a polymerizable liquid crystal monomer, a photoinitiator, an additive, a chiral dopant and a solvent;
    wherein the brightness enhancement film is a chiral nematic or cholesteric polymer liquid crystal film, with a reflection wavelength in a range of 380 nanometers (nm) to 2000 nm and a refractive index in a range of 1.5 to 1.7;
    wherein the liquid-crystal phase retardation film is a polymer liquid crystal film, with a phase retardation value of
    $$\pm(2k+1)\frac{\pi}{2}$$
    within a visible light wavelength range, where k is an integer; and
    wherein a temperature at which the first liquid crystal mixture or the second liquid crystal mixture exhibits a liquid crystal phase is in a range of 20° C. to 80° C.

5. The preparation method for the optical film as claimed in claim 4, wherein the polymerizable liquid crystal monomer is one or more selected from the group consisting of compounds represented by the following formulas I through VII:

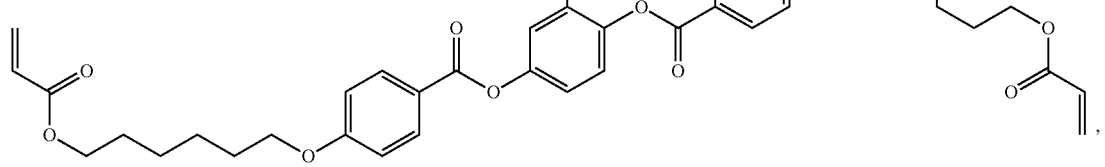
I
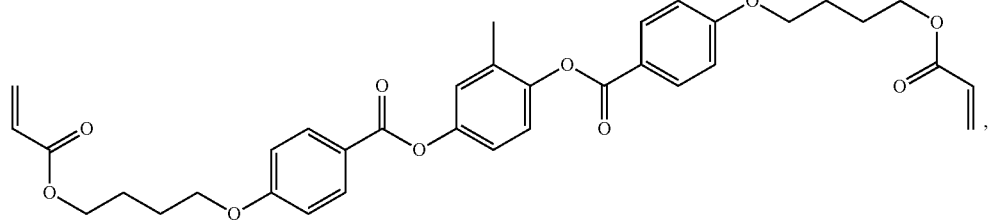
II
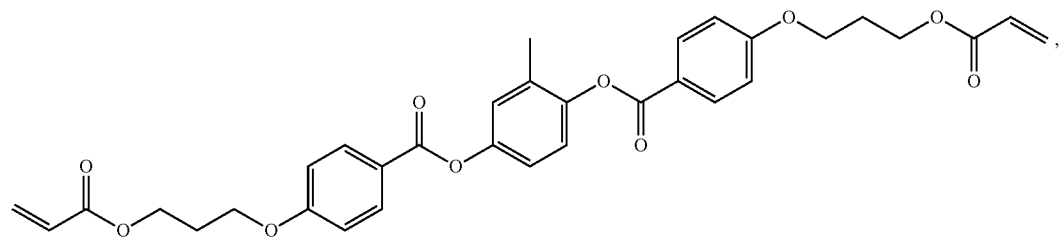
III
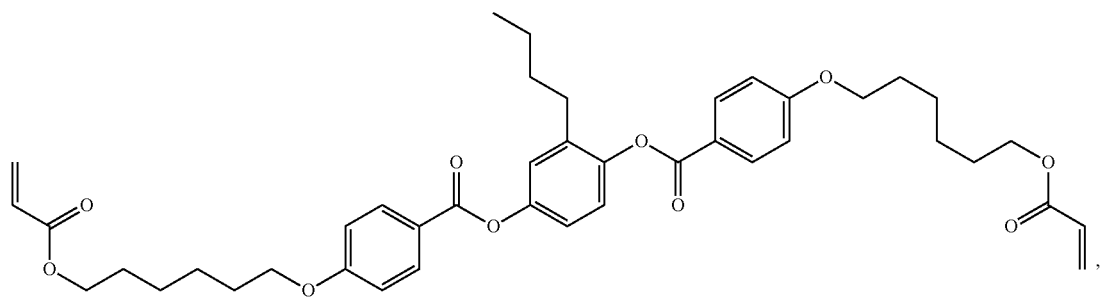
IV
V
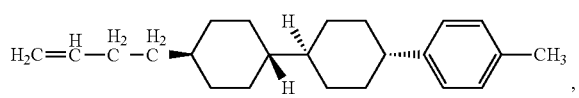
VI
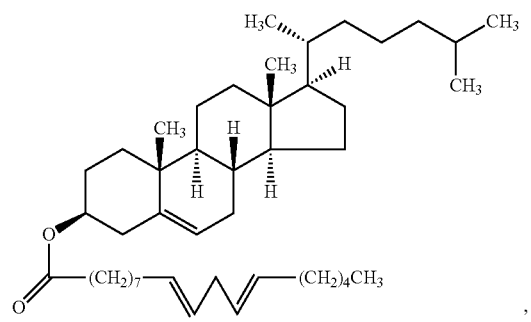
VII
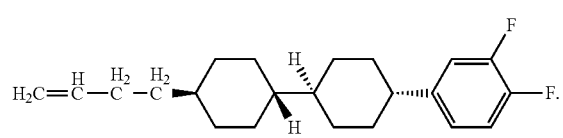

6. The preparation method for the optical film as claimed in claim 4, wherein the photoinitiator is one selected from the group consisting of 2-hydroxy-2-methylpropiophenone, diphenyl-(2,4,6-trimethylbenzoyl) phosphine oxide, 1-hydroxycyclohexyl phenyl ketone, 2-methyl-1-(4-methylthiophenyl)-2-morpholinyl-1-propanone, and 2,2-dimethoxy-2-phenylacetophenone (BDK);

wherein the additive comprises at least one of an antioxidant and a light stabilizer, the antioxidant is a hindered phenolic antioxidant, and the light stabilizer is a hindered amine light stabilizer;

wherein the solvent is one selected from the group consisting of toluene, ethyl acetate, ethanol, butyl acetate, and xylene; and wherein the chiral dopant is a polymerizable chiral compound, and the polymerizable chiral compound is one or more selected from the group consisting of compounds represented by the following formulas VIII through XII:

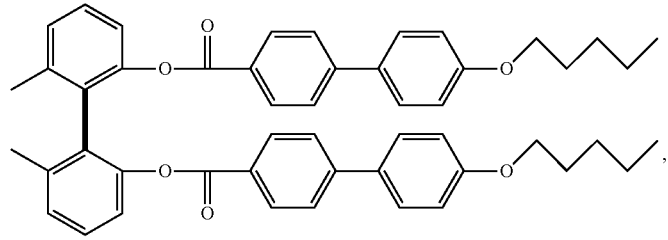

VIII

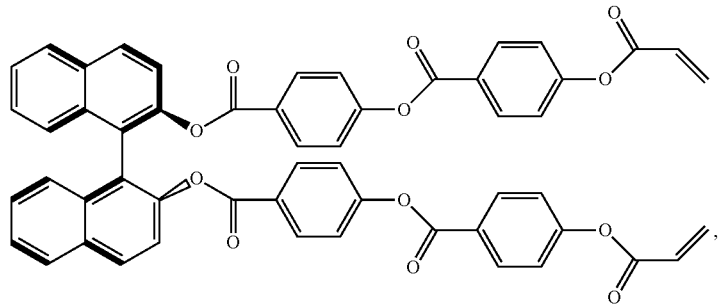

IX

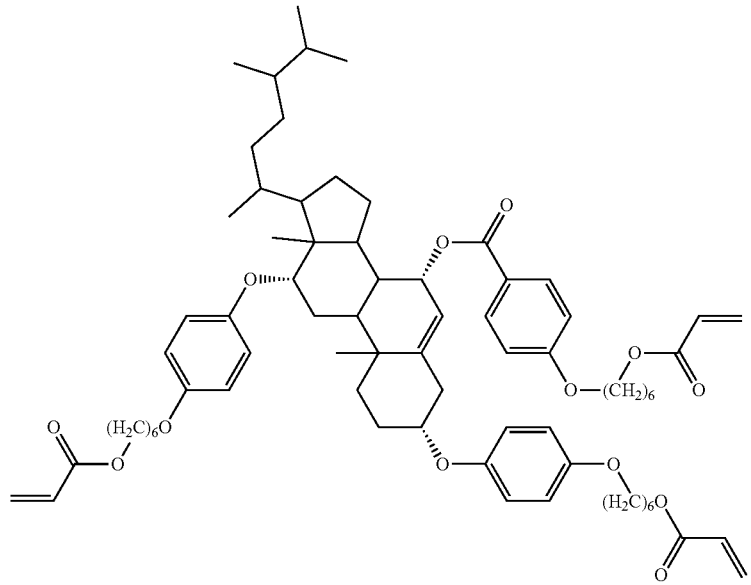

X

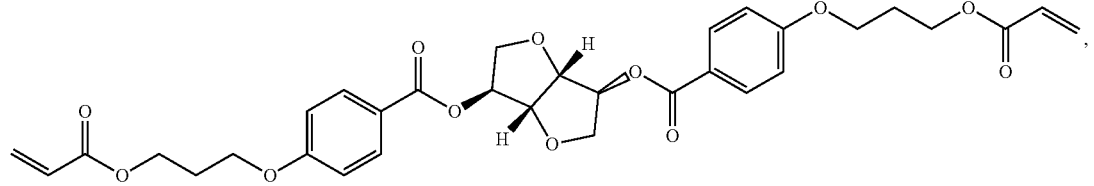

XI

-continued

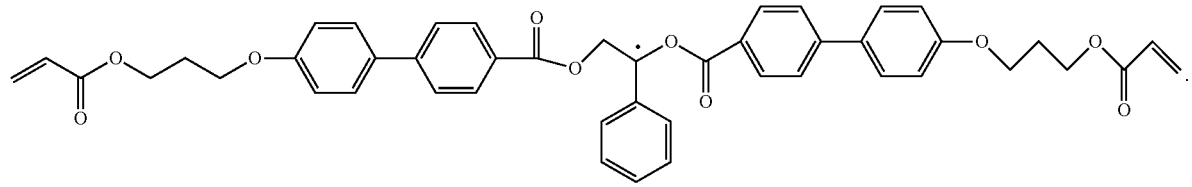

XII

7. An optical film, prepared by the preparation method for the optical film as claimed in claim 1.

8. An application of the optical film as claimed in claim 7 in fabricating an optical display.

9. An organic light-emitting diode (OLED) display, comprising: a linear polarizer, an optical film, and a light-emitting device; wherein the optical film is the optical film as claimed in claim 7.

10. A liquid crystal display, comprising: a linear polarizer, an optical film, and a backlight source; wherein the optical film is the optical film as claimed in claim 7.

* * * * *